United States Patent [19]
Orosy et al.

[11] 3,789,190
[45] Jan. 29, 1974

[54] TEMPERATURE REGULATION FOR ELECTRICAL HEATER

[75] Inventors: David J. Orosy; Abraham J. Matlen, both of Detroit, Mich.

[73] Assignee: Abraham J. Matlen, Detroit, Mich.

[22] Filed: Oct. 17, 1972

[21] Appl. No.: 298,294

[52] U.S. Cl............ 219/497, 219/494, 219/499, 219/501
[51] Int. Cl. .............................................. H05b 1/02
[58] Field of Search ............ 219/494, 497, 499, 501

[56] References Cited
UNITED STATES PATENTS

| | | | |
|---|---|---|---|
| 3,431,399 | 3/1969 | Venning | 219/497 |
| 3,646,577 | 2/1972 | Ernst | 219/501 X |
| 3,215,818 | 11/1965 | Deaton | 219/499 |
| 2,918,558 | 12/1959 | Evans | 219/499 |

*Primary Examiner*—Bernard A. Gilheany
*Assistant Examiner*—F. E. Bell
*Attorney, Agent, or Firm*—Cullen, Settle, Sloman & Cantor

[57] ABSTRACT

A temperature control system for use in an electrical heating device wherein the heating element also functions as the temperature sensing element. The resistance of the heating element varies linearly with temperature and the changes in resistance, detected as voltage variations across a wheatstone bridge, regulate the heating. The system is operable in either the A.C. or D.C. mode and includes a temperature measuring circuit, a timing circuit and a control circuit.

5 Claims, 7 Drawing Figures

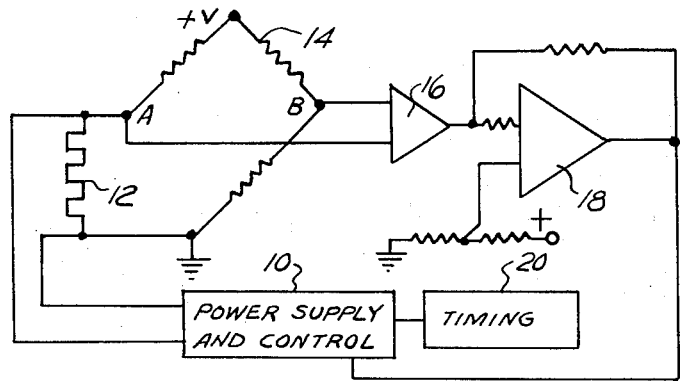
FIG. 1
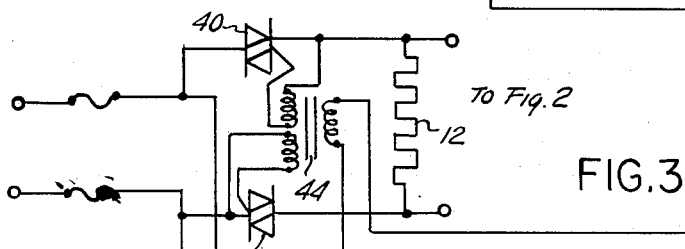
FIG. 3
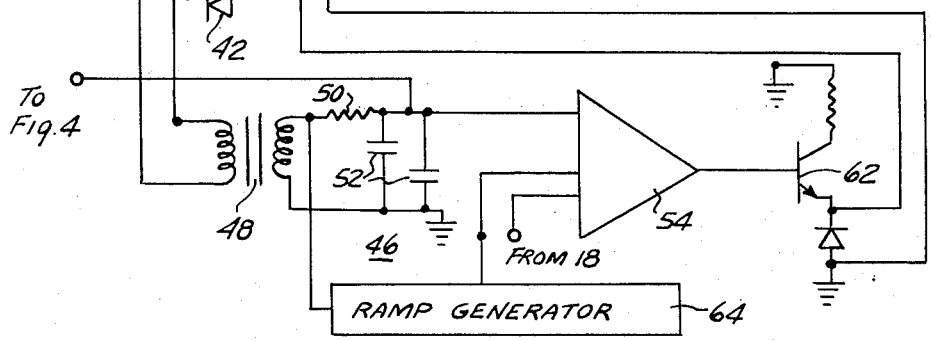
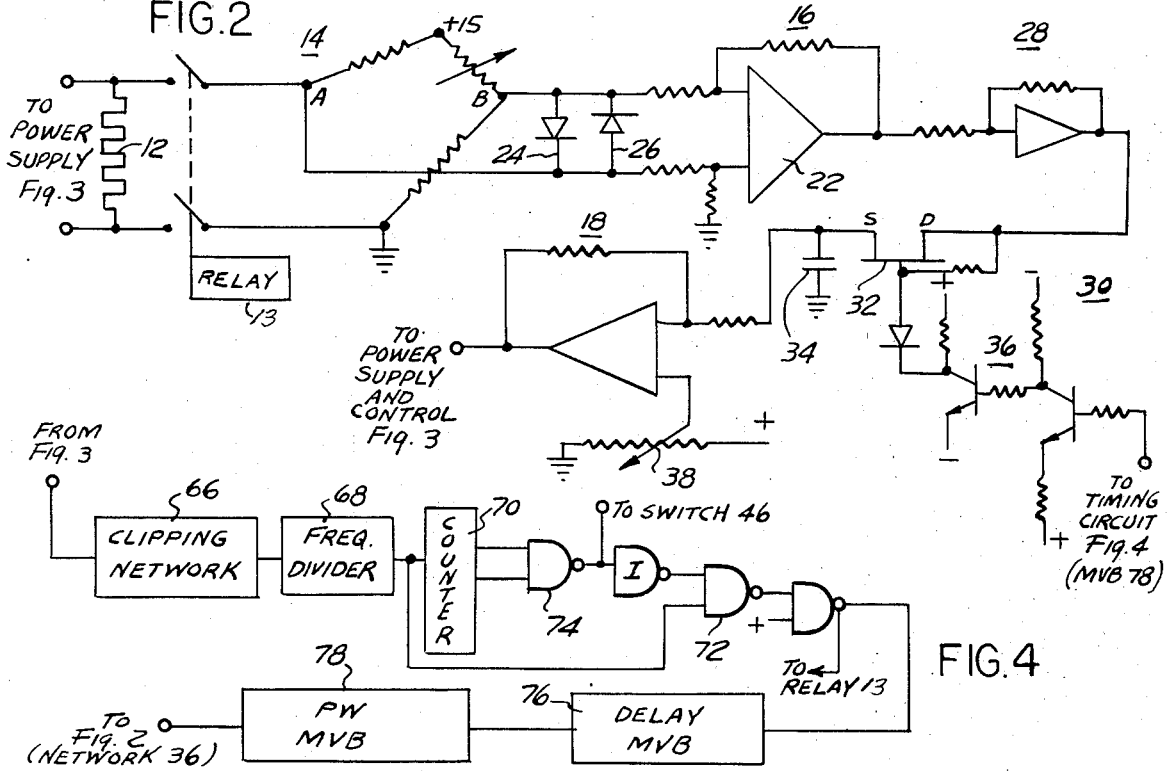
FIG. 2
FIG. 4

TEMPERATURE REGULATION FOR ELECTRICAL HEATER

BACKGROUND OF THE INVENTION

This invention relates generally to temperature regulation and, more particularly, to the regulation of the operating temperature of an electrical heating element.

In the use of electrical heating elements, whether commercial, residential or industrial, it is desired to maintain the operating temperature at a desired level without significant variation. It has been found, however, that most prior art regulators permit significant deviation from the desired operating temperature before additional power is permitted to be supplied to the heating element.

One of the reasons for temperature deviation in prior art control system is the use of a first element as the electrical heating element and a second element for sensing temperature.

In view of these shortcomings, it is an object of the present invention to provide a new and improved temperature regulation system utilizing an electrical heating element for both heating and temperature sensing.

It is a further object to provide a temperature regulation system operable in the alternating current or direct current modes.

BRIEF DESCRIPTION OF THE FIGURES

The foregoing objects of the present invention, together with other objects and advantages which may be attained by its use, will become more apparent upon reading the following description, taken in conjunction with the drawings.

In the drawings, wherein like numerals designate corresponding parts:

FIG. 1 is a basic schematic diagram of the temperature regulation system of the present invention.

FIG. 2 is a circuit schematic of the temperature measuring and comparison portion of the present system operable in the alternating current mode.

FIG. 3 is a schematic diagram of the power supply and control circuit of the present invention operable in the alternating current mode.

FIG. 4 is a schematic diagram, partially in block form, of the timing circuit of the present invention operable in the alternating current mode.

DETAILED DESCRIPTION OF THE INVENTION

THEORY OF OPERATION

Figure 5:
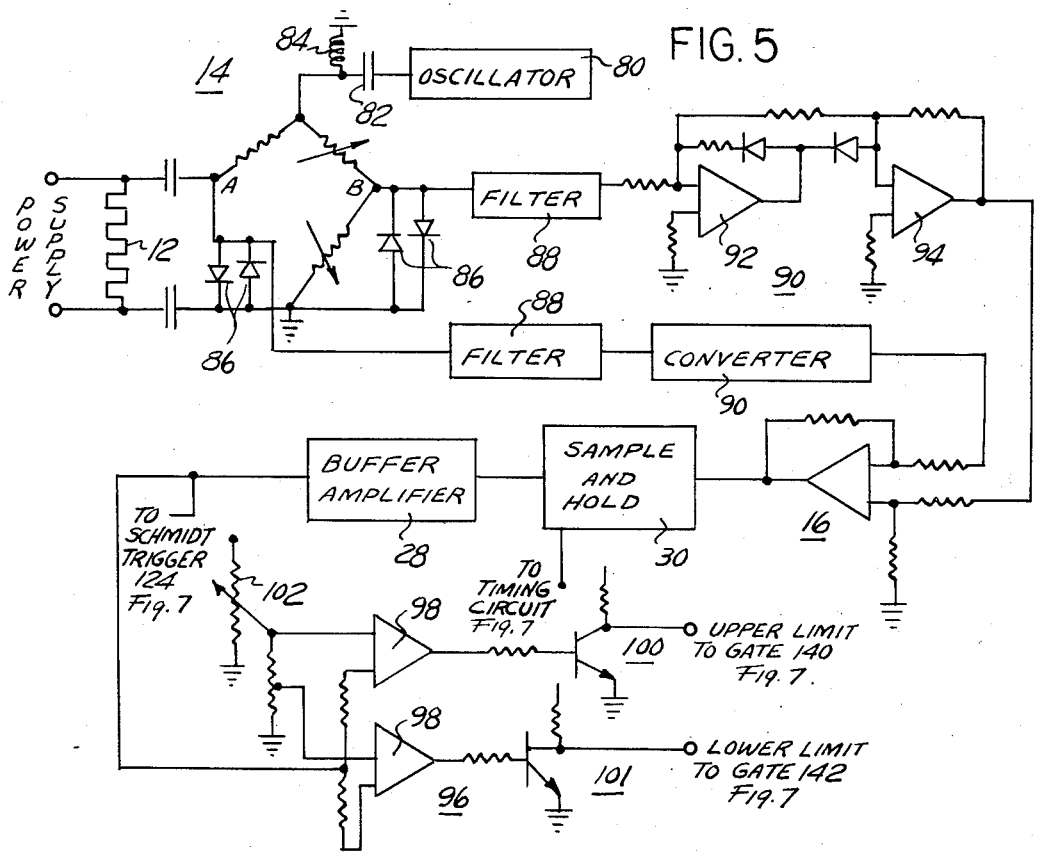
FIG. 5 is a circuit schematic of the measuring and comparison portion of the circuit, operable in the direct current mode.

Prior to an explanation of the various circuits involved in the present invention, a brief explanation of the underlying theory will aid in a proper understanding of the applicant's contribution.

It is well known that the resistance of various substances, such as metal, change with changes in temperature. In the majority of such material, the change is substantially non-linear and ofttimes exponential. However, there are certain metals which exhibit a substantially linear change in resistance as a function of change in temperature. The present invention is directed to a recognition of this characteristic and a utilization to permit a metal, used as a resistance heater, to perform two functions; the heating function as current is passed through the element and as a temperature sensing element. The present invention utilizes an alternating or cyclic procedure of heating and temperature sensing several times per second. During the temperature sensing portion of the cycle, the power to the heating element is off and the heating element serves as a leg of a wheatstone bridge. Changes in the temperature of the heating element cause a corresponding change in resistance which results in an electrical imbalance of the bridge. This imbalance is converted to an error signal which is proportional to the resistance of the heating element.

Various metals having this linear temperature characteristic may be utilized. One heating element which has proven successful is Hoskins Chromel D which exhibits a 0.02 percent increase in resistance per degree Fahrenheit. Chromel D is an alloy of substantially the following proportion: 35 percent nickel, 25 percent chromium, 40 percent iron.

CIRCUIT DESCRIPTION:

Referring to FIG. 1, the temperature measuring and regulating system of the present invention includes a power supply and control, a temperature measuring and comparison circuit, and a timing network. The power supply and control 10 is connected in parallel across an electrical resistance or heating element 12. The electrical resistance heating element serves as the fourth leg of a wheatstone bridge 14. A constant voltage is connected across the bridge and the change in temperature of the heating element 12 causes a change in its resistance which results in a bridge imbalance. This bridge imbalance results in an error voltage between the points A and B of the bridge which is detected by a differential amplifier 16.

The output of the differential amplifier is coupled to a comparator 18 having an adjustable input which may be set to reflect the desired operating temperature. The output of the comparator 18 indicates whether the temperature of the resistant element 12 is too high, too low or the desired operating temperature and controls the addition of power to the heating element 12. A timing circuit 20 controls the cyclic operation of the application of power, testing of the heating temperature, comparison with the desired temperature and subsequent application of power during the next heating cycle.

The foregoing description relates to both the A.C. and D.C. modes of operation. The specific circuitry utilized in the A.C. mode will now be explained. Referring to FIG. 2, the circuit for measuring temperature and comparing the measured temperature with the desired temperature will now be explained. FIG. 2 includes a resistance heater 12 connectible through a relay 13 as the fourth leg of a wheatstone bridge 14. A constant 15 volts is maintained across the bridge.

The outputs from terminals A and B of the bridge serve as two inputs to the differential amplifier 16. The differential amplifier includes an operational amplifier 22 and a pair of oppositely poled diodes, 24,26 across the input to the operational amplifier to isolate the operational amplifier from voltage transients from the wheatstone bridge. Not illustrated is the offset adjustment for the operational amplifier 22.

The output from the differential amplifier 16 is coupled to a buffer amplifier 28 which operates to adjust the system voltage gain and further isolate the differential amplifier 16 from a sample and hold circuit 30.

It must be appreciated that during the application of power to the resistance heating element 12 and during the time interval when there is no power to the heating element 12 the temperature of the heating element will rise and fall, respectively, thus the error voltage across the wheatstone bridge 14 will be constantly varying. Since the alternating cycle of heating and testing is repeated several times each second, these variations may be ignored and the error voltage at the beginning of each measuring cycle may be utilized to control the subsequent heating until the next temperature measurement cycle occurs. The sample and hold circuit 30 provides the function of storing the error voltage which has been detected across the wheatstone bridge 14. To accomplish this, a field effect transistor (FET) 32 gates the sample and hold network on to permit the error voltage to be stored as a charge across a capacitor 34. A driving circuit 36 which is coupled to the timing circuit operates to control the FET 32 and thus regulate the charging and discharging of the capacitor 34.

The output of the capacitor 34 from the sample and hold circuit serves as the input to the comparator 18 which includes a two input differential amplifier and a variable resistance 38 coupled to one input of the comparator. This input may be set to reflect the desired operating temperature of the resistance heating element. The output of the comparator 18 is referred to as the D.C. or error control voltage and is coupled to the power control circuit.

Referring next to FIG. 3, power is provided to the system from a 240 volt alternating current single phase voltage which is connected in a series circuit through a first triac 40, the electric heating element 12 and a second triac 42. A transformer 44 turns on the triac simultaneously by a pulse coupled to the gate of each triac. These pulses are generated at the rate of 120 per second and occur at the zero cross-over point of the 240 volt line voltage. These pulses are generated by a zero voltage cross-over switch 46 the output of which is coupled to the primary winding of transformer 44.

The zero cross-over switch 46 provides pulses at the 120 cycle rate, thus turning off the triacs 40 and 42 8.33 milliseconds after they are turned on. This cyclic operation of turning the triacs on and off regulate the power supply to the resistance heating element 12.

The zero voltage cross-over switch 46 includes a transformer 48 which is coupled to the A.C. line voltage and reduces that voltage by the ratio of one to four. In addition to voltage reduction, transformer 48 provides a synchronizing signal for timing purposes. The circuit consisting of series resistor 50 and parallel capacitors 52 act as a phase shift network to allow the voltage from the transformer 48 to be shifted in phase and supplied as one input to a comparator 54. This phase shifting is to permit the output of the comparator 54 to provide pulses which occur at the zero cross-over points of the A.C. line voltage, thus insuring that the triacs are turned on at the zero cross-over points and eliminating any radio interference signals from the triacs.

The zero voltage switch 46 has as one input the error control voltage from the comparator 18. Another input to the comparator is a linear ramp voltage of 3 volts in amplitude and 265.6 milliseconds in duration. The comparator 54 compares the ramp voltage with the error control voltage and as long as the ramp voltage is less than the control voltage output pulses are generated by the comparator 54. These output pulses are fed through a transistor 62 to the primary winding of transformer 44. If the D.C. control voltage equals the magnitude of the ramp voltage, the turn on pulses are generated continuously by the comparator 54 except for a 32 millisecond time interval during which the resistance of the heating element 12 is sensed. Thus, it may be said that a control voltage from the comparator 18 equal to 3 volts corresponds to the maximum time interval for which triaces 40 and 42 will be turned on and the maximum power applied to the heater during the heating portion of the cycle.

A linear ramp voltage generator 64 having adjustments for the ramp period and the voltage level, takes an input from transformer 48 and provides an output to the comparator 54.

Referring next to FIG. 4, the timing circuit of the present invention takes as its input the alternating current signals after phase shifting from the zero voltage switch 46. These signals are provided to a clipping network 66 which reduces them to a 4-volt one-half wave rectified 60 cycle signal and the output of the clipping network is supplied to a bistable multi-vibrator or frequency divider 68 which reduces the input to a 30 cycle per second signal.

The output of the frequency divider is connected to the input of a counter 70 and also connected to a NAND gate 72. The counter 70 operates to provide both a binary 8 and binary 4 output; these outputs are fed to inputs of a NAND gate 74 with the result being an output pulse of 32 millisecond duration occuring 249 milliseconds after the start of each cycle.

One purpose of the gating logic is to inhibit turning on of the triacs 40 and 42 during the temperature sensing portion of the cycle. To accomplish this, the output of the gate 74 provides an inhibit pulse to the zero cross-over trigger circuit 46 of a 32 millisecond duration. The gating network also supplies control pulses for the relay 13, when the triacs are off, to connect the heating element 12 to the wheatstone bridge 14 for a period of 16 milliseconds commencing 16 milliseconds after the triacs are turned off.

The output of the gating logic is connected to a delay multi-vibrator 76 which provides a 2 millisecond delay. The output of the delay multi-vibrator is connected to the input of a pulse width multi-vibrator 78 which stretches the delayed output pulse. This stretched pulse serves as the input to the transistor network 36 of the sample and hold circuit 30 to control the period for sampling the error voltage across the wheatstone bridge. In the preferred embodiment, the logic delay and pulse width network provide a 2.7 millisecond time interval for the sample and hold circuit; the various timing considerations and delays were incorporated to eliminate any errors due to relay switching transients.

OPERATION

Having thus explained the circuitry involved in the present invention, operation in the alternating current mode will now be explained. With reference first to the timing network, every 249 milliseconds inhibit pulse from the NAND gate 74 turns off the triacs for a period of 32 milliseconds. 16 milliseconds later, the sample and hold network is turned on for a period of 2.7 milliseconds during which time the error voltage from the wheatstone bridge is sampled. This sampled voltage is compared with the desired potential set across the variable resistance 38 of the comparator 18 and the difference, the D.C. or error control voltage, is supplied to the zero voltage switch 46. The zero voltage switch compares this error voltage to the ramp voltage from the ramp generator 64 and the difference therebetween determines whether or not the triacs are to be turned on and power supplied to the heater during the next heating portion of the cycle.

The cyclic operation of applying heat (when the heating temperature is below the desired level) and sensing the temperature, several times each second, provides close control of the heating temperature.

The 3-volt amplitude of the ramp generator corresponds to the reference voltage (desired potential) of the comparator 18. With the heating element 12 at room temperature, there is no error voltage across the bridge and the input to the comparator from the sample and hold circuit is zero volts. Since the reference voltage is 3 volts, the comparator output is 3 volts. As the heating element is heated, an error voltage across the bridge developes and the comparator output, which is the difference between the error voltage and the reference, decreases. The output of the comparator controls the power to the triacs via the cross-over trigger switch 46.

As the error voltage increases, the control voltage decreases from 3 volts to zero and power to the heater decreases. When the error voltage reaches 3 volts, the control voltage is zero and power to the heater is cut off. Once power to the heater is cut off, the heater begins to cool the error voltage across the bridge drops below three volts, the control voltage increases turning power back on. These settings will maintain the heater at a particular temperature. For a lower temperature, the reference voltage at variable resistor 38 is set to a lower value and the ramp voltage is set to the same lower value.

Figure 7:
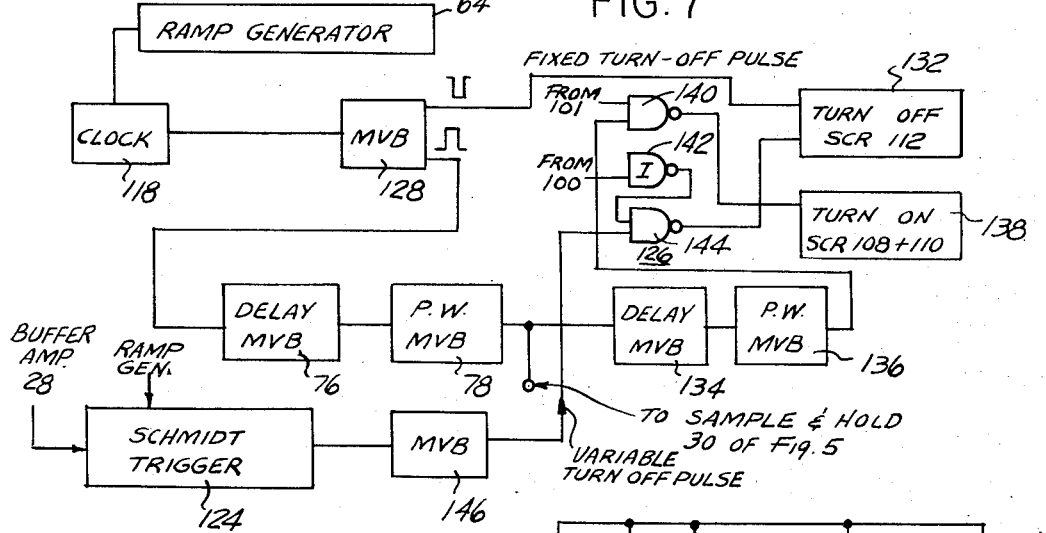
FIG. 7 is a circuit schematic, partially in block form, of the timing circuit of the present invention, operable in the direct current mode.
Figure 6:
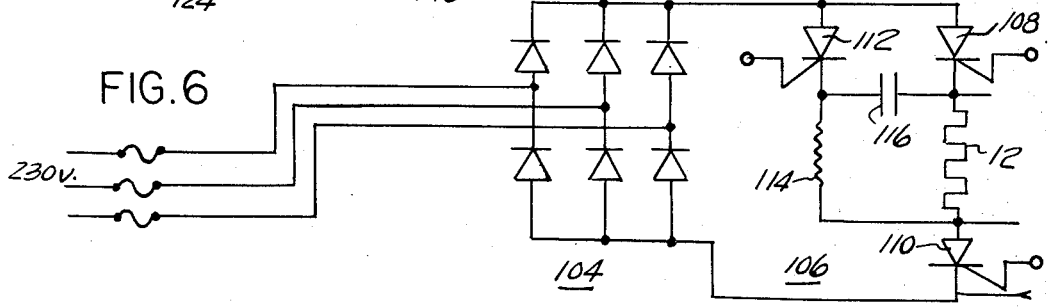
FIG. 6 is a diagram of the power supply and control circuit of the present invention operable in the direct current mode.

Referring next to FIGS. 5, 6 and 7, the circuit for temperature regulation in the D.C. mode will be explained. FIG. 5 illustrates the measuring and comparator circuit of the present invention operable in direct current mode and includes the resistance heating element 12, capacitively coupled as the fourth leg of a wheatstone bridge 14. An oscillator circuit 80 including a voltage regulated output provides a 100 KHZ signal at low impedance to the wheatstone bridge. The oscillator output is coupled by a capacitor 82 and inductor 84 to the wheatstone bridge with the inductor acting to suppress low frequency transient signals.

The wheatstone bridge network is adjustable to provide balance and there are two A.C. signal paths from the bridge, one from point A and the other from point B, with the voltage difference between points A and B being the error voltage. Points A and B are coupled to ground by a pair of alternately poled diodes 86 to clip any transients, which may have been supplied to the bridge from the heater 12 during the heating portion of the cycle, from the rest of the circuit. The voltage level from the oscillator 80 is much less than the saturation level of the diodes and therefore the diodes present a high impedence to the oscillator and there is no clipping of the oscillator output.

Each output path from the wheatstone bridge 14 is connected to an identical channel including a bandpass filter 88 to remove unwanted transients. The filter has a center frequency of 100 KHZ and blocks all signals above 100.5 KHZ or below 99.5 KHZ. The filter also amplifies the signal and the output of the filter is coupled to an A.C. to D.C. converter 90.

The converter 90 includes two operational amplifiers 92 and 94 with the first operational amplifier acting as a unity gain half wave rectifier and the second amplifier operating to add and integrate the original input signal and the output of the first operational amplifier. The output of the A.C. to D.C. converter is a direct current signal having an amplitude equal to the absolute value of the input signal. Convertors of this nature are sometimes referred to as absoluted value converter and driver networks.

A second combination of filter and converter performs the same functions on the A output from the wheatstone bridge 14. The two converted signals serve as the two inputs to a differential amplifier 16. The output of the differential amplifier 16 serves as the input to a sample and hold circuit 30 including an FET 32, a sampling capacitor 34 and a transistor control network 36, all of which operate in the same fashion as the sample and hold network 30 of the A.C. mode. The output of the sample and hold circuit serves as the input to a buffer amplifier 28. It is noted that the buffer amplifier in the D.C. mode is located after the sample and hold circuit while in the A.C. mode it is located prior to the sample and hold circuit. The isolation effect of a buffer amplifier is not required prior to a sample and hold circuit in a D.C. mode operation because of signal characteristics.

The output of the buffer amplifier serves as the input to a window discriminator 96 which includes two parallel paths. In each path of the window discriminator there is an operational amplifier 98 which drives an emitter follower transistor switch 100. The purpose of the window discriminator is to generate a command voltage to inhibit turning off of the power supply if the temperature falls below a predetermined lower limit and similarly inhibits turning on the power supply if the temperature goes above an upper limit. When the error voltage across the wheatstone bridge is between the two reference levels of the window discriminator, the discriminator does not affect turn on or turn off of the power supply.

One input to each operational amplifier 98 includes an adjustable resistor 102 which may be set to the desired operating temperature. Setting the adjustable resistor 102 operates to set the lower limit and the upper limit for the window discriminators at a temperature a particular number of degrees above and below the desired operating temperature. These serve as one input to each operational amplifier 98 and the other input comes from the output of the buffer amplifier. A particular output from the window discriminator occurs to inhibit turn on or turn off pulses only if the amplifier output exceeds a predetermined voltage which is sufficient to turn on the switching transistors 100.

Referring next to FIG. 6, the power supply and the power control of the present invention operable in the direct current mode includes a three phase, 230 volt A.C. line voltage which is coupled through a three phase full wave rectifier network 104 to a power switch 106 which includes an SCR 108 coupled in series with the resistance heating element 12 which is coupled in series with another SCR 110. A third SCR 112 is coupled to a resistor 114 which is capacitably coupled in parallel with the resistance heating element 12.

When gating signals are applied to the gates of the SCRs 108 and 110 the full input voltage is applied across the heater element 12. During the time that the SCRs 108 and 110 are conducting, a charge build-up across the capacitor 116 to equal the heater voltage. When a turn-off pulse is applied to the gate of SCR 112, it conducts coupling capacitor 116 across the SCR 108. The charge on the capacitor momentarily reverse biases the SCR 108 causing it to turn off which also causes SCR 110 to turn off. After the discharge current of the capacitor 116 drops below the holding level of the SCR 112, the SCR 112 also turns off. All three SCRs are now turned off with SCRs 108 and 110 isolating the D.C. supply voltage from the heating element.

As in the A.C. mode of operation, it is during the time interval that power is cut off from the heating element that the error voltage across the bridge is measured.

Referring next to FIG. 7, the timing circuit of the present invention includes a clock pulse generator 118 which may be adjusted to the desired charge rate which, in the preferred D.C. embodiment, is four pulses per second. The output of the clock pulses serve as an input to the ramp generator 64, thus determining the duration of the ramp voltage, and synchronizing the turn-on and turn-off of the SCRs in the power supply. The output of the ramp generator serves as one input to a voltage controlled Schmidt trigger 124. The other input to the Schmidt trigger is the error voltage from the buffer amplifier 28.

The output of the clock pulse generator 118 serves as one input to the logic network 126. Specifically, the output pulse triggers a monostable multi-vibrator 128 to generate a 29 microsecond pulse to turn off power to the switch 106. This pulse occurs once each 4 seconds which is the repetition rate of the clock. The multi-vibrator provides a positive going output and a negative going output. The negative going output operates to trigger an amplifier 132 which is coupled via a transformer to generate a turn-off pulse at the gate of SCR 112.

The positive pulse from the multi-vibrator 128 is connected to a delay multi-vibrator 76 and a pulse width multi-vibrator 78 which in turn are connected to the transistor network 36 of the sample and hold circuit 30. This controls the occurrence and duration of the sample time during which the error voltage across the wheatstone bridge 14 is sampled. In the direct current embodiment, the sample interval is of one millisecond duration. The output from the multi-vibrator 128 also goes to a delay circuit 134 to provide a four second delay prior to turning on the power which then triggers another pulse width multi-vibrator 136 to generate an output pulse of 25 microsecond duration.

This microsecond pulse is fed to the logic network 126 the output of which is coupled to the turn-on amplifier 138 including a transformer to the gates of the SCR 108 and 110. This couples power to the heater.

The logic network 126 includes a plurality of NAND gates 140, 142 and 144. NAND gate 140 has as its input the output of the pulse width multi-vibrator 36 and the upper limit output from the window discriminator 96. The output from the upper limit portion of the window discriminator being high inhibits the NAND gate 140 and prevents the turn-on amplifier 136 from turning on the power switch. NAND gate 142 has as its input the output of the lower limit transistor switch from the window discriminator 96 and NAND gate 142 operates as an inverter coupling its output to one input of NAND gate 144. The second input to NAND gate 144 comes from the Schmidt trigger through a multi-vibrator 146 and the concurrent pulses permits a variable pulse to be generated at the base of the SCR 112.

In summary, as long as the error voltage is below the lower limit, the output of the transistor switch associated therewith remains low, NAND gate 140 is not inhibited, and maximum power is applied to heater (i.e., variable turn off from Schmidt trigger 124 is inhibited with fixed turn off and turn on controlling power to heater). When the D.C. error voltage is above the lower limit and below the upper limit, NAND gates 140 and 144 are not inhibited and an amount of power is applied to heater to keep its temperature constant, (i.e., fixed turn off and variable turn off and turn on control power to the heater with variable turn off determining the duration of the power to be delivered to heater). When the D.C. error voltage is above the upper limit power to the heater heater is turned off (i.e., turn on is inhibited). The variable turn-off and turn-on rate is controlled by the Schmidt trigger 124, which generates a variable turn off pulse proportional to the D.C. error voltage when the error voltage is between the upper and lower limits.

The Schmidt trigger compares the output of the ramp generator 64 with the output of the buffer amplifier 28. Thus, the Schmidt trigger actually compares a repeating ramp voltage with the error control voltage. The Schmidt trigger generates a pulse where the duration is proportional to the voltage difference between the ramp and the error voltage.

As the ramp voltage increases to the point where it equals and starts to exceed the error voltage, the output of the Schmidt trigger generates a pulse which triggers a turn off multi-vibrator 146. This pulse passes through the NAND gate 144, unless the NAND gate is inhibited from the output of the lower limit transistor switch of the window discriminator and thus causes a turn off pulse to br sent to the power supply. When the ramp voltage at the Schmidt trigger input drops below the error voltage, the output is insufficient to trigger the multi-vibrator 146.

The operation of the alternating current mode has been previously explained. With the exception of the circuit network characteristics identified above, the principles of operation of the direct current mode of operation is similar.

Applicants' invention is directed to the use of an electrical heating element to perform two functions; heating and temperature sensing.

Various metals can be used as a sensing and heat control device once its temperature versus resistance characteristics are known. If the metal exhibits exponential characteristics, then the D.C. reference voltage comparators 102 will be made exponential to match the heater's characteristics. Whatever the characteristic curve of the metal the reference voltage will be changed to match the metal's characteristic curve.

The D.C. error voltage, which is proportional to the resistance change of the heating element, can be adapted to any form of power control. For example in the present environment, the D.C. error voltage is used to give a proportional on/off control of a D.C. power source. However, the same D.C. error voltage could be used to control a continuously variable D.C. regulated power source or control an A.D./D.C. generator supplying power to a resistive load.

Preferred embodiment have been disclosed to permit use in either the alternating current or the direct current mode.

However, it should be noted that although an amplitude modulated type of A.C. sensing was disclosed, a phase shift type of sensing could also have been used where the resistive heating element is part of a phase shift network causing an A.C. existing voltage to be phase-shifted with respect to an A.C. reference voltage of the same frequency. The degree of phase shift would then be proportional to the change in the heating element's resistance.

Various circuits have been described although certain features, such as adjustments for operational amplifiers, etc., have been omitted since they are well-known in the art. It may be appreciated that various circuitry may be substituted for the described circuitry without departing from Applicants' contribution. Therefore, the description of two embodiments for the use of the present invention should not be read in a restrictive sense but only for describing one application of the underlying concept of the present invention. The invention may be further developed within the scope of the following claims.

What is claimed is:

1. A system for measuring and regulating the temperature of an electrical heating element comprising:
    control means for regulating the power to an electrical heating element, including a full-wave retifier and an SCR operable for switching power to said heating element during a heating cycle and switching power away from said heating element during temperature measurement, and means for switching power away from said heating element during said heating cycle when the temperature of the heating element reaches a predetermined value including a Schmidt trigger controlling the cyclic operation of said SCR and further including logic means for preventing the turning on of said SCR to supply said heating element;
    means for measuring changes in the resistance of said electrical heating element, and
    a timing circuit cooperating with said control means and said measuring means for measuring said resistance only when said control means ceases to supply power to said heating element.

2. The system as in claim 1, operable in the alternating current mode wherein said timing circuit comprises:
    means responsive to the signal from a power supply for generating signals when nulls occur in the alternating current input,
    a transformer for operating said timing circuit in synchronization with said power supply, and
    pulse shaping and delay means coupled to said control means and said measuring means to permit temperature measurement only when no power is being provided to said heating element.

3. The system of claim 1, operable in the direct current mode, wherein said timing circuit includes:
    a source of clock pulses, and
    logic means to permit temperature movement only when no power is being supplied to said heating element.

4. The system of claim 1 operable in the alternating current mode wherein said measuring means comprises:
    a wheatstone bridge having the heating element as one leg thereof;
    a differential amplifier for detecting voltage variations across said bridge;
    a sampling circuit responsive to the output of said differential amplifier for charging a capacitor to reflect said voltage variations; and
    a comparator, adjustable to the desired heating element temperature, for comparing said voltage variations on said capacitor with the desired heating element temperature.

5. The system of claim 1 operable in the direct current mode, wherein said measuring means comprises:
    a wheatstone bridge having the heating element as one leg thereof;
    an oscillator coupled to said bridge;
    filter means coupled to the output of said bridge for eliminating signal transients from the bridge output;
    means for converting the output of said filter means into direct current signals;
    a differential amplifier receiving the output of said filter means for detecting voltage variations across said bridge;
    a sampling current responsive to the output of said differential amplifier for charging a capacitor to reflect said voltage variations; and
    a comparator, adjustable to the desired heating element temperature, for comparing said voltage variations on said capacitor with the desired heating element temperature.

* * * * *